(12) United States Patent
Biswas

(10) Patent No.: US 10,007,790 B2
(45) Date of Patent: Jun. 26, 2018

(54) SECURE APPLICATION DEVELOPMENT AND EXECUTION

(71) Applicant: EMPIRE TECHNOLOGY DEVELOPMENT LLC, Wilmington, DE (US)

(72) Inventor: Soma Biswas, Lausanne (CH)

(73) Assignee: Empire Technology Development LLC, Wilmington, DE (US)

( * ) Notice: Subject to any disclaimer, the term of this patent is extended or adjusted under 35 U.S.C. 154(b) by 387 days.

(21) Appl. No.: 14/298,726

(22) Filed: Jun. 6, 2014

(65) Prior Publication Data
US 2015/0356293 A1   Dec. 10, 2015

(51) Int. Cl.
G06F 21/53 (2013.01)
G06F 21/57 (2013.01)
G06F 21/31 (2013.01)

(52) U.S. Cl.
CPC .............. *G06F 21/57* (2013.01); *G06F 21/31* (2013.01); *G06F 2221/2105* (2013.01)

(58) Field of Classification Search
CPC .......... G06F 21/53; G06F 21/57; G06F 21/60; G06F 21/72; G06F 21/602; G06F 21/54; H04L 63/045; H04L 63/062; H04L 63/0428
USPC ............................................ 726/22; 713/165
See application file for complete search history.

(56) References Cited

U.S. PATENT DOCUMENTS

2012/0042162 A1* 2/2012 Anglin .................... G06F 21/57
                                                        713/165
2013/0198849 A1   8/2013 Ada et al.

FOREIGN PATENT DOCUMENTS

WO   WO2013/142947   * 10/2013 ............. G06F 21/54

OTHER PUBLICATIONS

Bajaj et al., "TrustedDB: A Trusted Hardware based Database with Privacy and Data Confidentiality", SIGMOD'11, Jun. 12-16, 2011.*
"BYOD Ready", accessed at http://www.collabera.com/optimobility/byod_ready.html, accessed on Oct. 15, 2013, p. 1-1.
"Hooking", Wikipedia, accessed at http://web.archive.org/web/20140228021534/http://en.wikipedia.org/wiki/Hooking, last modified on Feb. 27, 2014, pp. 1-8.
"Model-view-controller", Wikipedia, accessed at http://web.archive.org/web/20140422011434/https://en.wikipedia.org/wiki/Model%20E2%80%93view%E2%80%93controller, last modified on Apr. 20, 2014, pp. 1-7.
"Protect Your Most Personal Device", Lookout, accessed at http://web.archive.org/web/20140328053307/https://www.lookout.com/features/security, accessed on May 8, 2014, pp. 1-5.
"Proxy re-encryption", Wikipedia, accessed at http://web.archive.org/web/20140413102002/http://en.wikipedia.org/wiki/Proxy_re-encryption, last modified on Oct. 13, 2013, pp. 1-4.

(Continued)

*Primary Examiner* — Noura Zoubair

(57) ABSTRACT

Examples of secure application development and execution are disclosed herein. An example method may include parsing code of an application configured for execution on a user device to identify one or more sensitive portions of the code. Example methods may further include identifying a trusted execution environment, different from the user device, suitable to execute the one or more sensitive portions of the code. Example methods may further include configuring the code to provide the one or more sensitive portions of the code from the user device to the trusted execution environment during execution of the application on the user device.

28 Claims, 9 Drawing Sheets

(56) References Cited

OTHER PUBLICATIONS

"SANS Mobility BYOD Security Survey", accessed at http://web.archive.org/web/20121007020714/http://www.bradfordnetworks.com/sans-mobility-byod-security-survey, accessed on May 8, 2014, pp. 1-2.
"Security Development Lifecycle", Microsoft, accesssed at http://web.archive.org/web/20140426205223/http://www.microsoft.com/security/sdl/default.aspx, accessed on Mar. 8, 2014, pp. 1-2.
Arlotta, C. J., "Bring Your Own Software (BYOS), Not BYOD, Is Real Challenge", accessed at http://web.archive.org/web/20130906074632/http://mspmentor.net/managed-services/bring-your-own-software-byos-not-byod-real-challenge, Apr. 29, 2013, pp. 1-4.
Biswas, D et al., "Privacy Panel: Usable and Quantifiable Mobile Privacy", In proceedings of the 8th International Conference on Availability, Reliability and Security, Sep. 2-6, 2013, 218-223.
Boyles, J. L., "Privacy and Data Management on Mobile Devices", accessed at http://web.archive.org/web/20140112172242/http://www.pewinternet.org/Reports/2012/Mobile-Privacy.aspx, Sep. 5, 2012, p. 1-1.
Chansanchai, , "iPhone flaw allows apps access to your contacts", NBC News, accessed at http://technolog-discuss.nbcnews.com/_news/2012/02/15/10416360-iphone-flaw-allows-apps-access-to-your-contacts?lite, Feb. 15, 2012, pp. 1-8.
Christin, D et al., "A Survey on Privacy in Mobile Participatory Sensing Applications", Journal of Systems and Software, vol. 84, Issue 11, Nov. 2011, 1928-1946.
Nachenberg, C. , "A Window Into Mobile Device Security", Symantec Security Response, Tech. rep., pp. 1-23 (2011).
Phifer, L. , "BYOD security strategies: Balancing BYOD risks and rewards", accessed at http://web.archive.org/web/20131207001204/http://searchsecurity.techtarget.com/feature/BYOD-security-strategies-Balancing-BYOD-risks-and-rewards, Jan. 28, 2013, pp. 1-14.
Taft, D. , "IBM Worklight: Big Blue's Arsenal for Mobile App Developers", IBM Worklight, accessed at http://www.eweek.com/developer/ibm-worklight-big-blues-arsenal-for-mobile-app-devel, Oct. 4, 2013, pp. 1-7.
Zumerle, , "Security Think Tank: BYOD security: policy, control, containment, and management", accessed at http://web.archive.org/web/20140411012802/http://www.computerweekly.com/opinion/Security-Think-Tank-BYOD-security-policy-control-containment-and-management, May 3, 2013, pp. 1-16.

* cited by examiner

SECURE APPLICATION DEVELOPMENT AND EXECUTION

BACKGROUND

With the proliferation of smart devices, such as smart phones, an increasing number of users rely on devices for both personal and professional use. For example, a user may rely on a mobile device as both a cell phone and an email client. A policy implemented by an organization allowing the use of a device in this manner is often referred to as a "bring your own device" (BYOD) policy.

While adopting such a policy may ultimately result in cost savings for an organization, additional security risks may be incurred as well. For example, devices may include malicious applications that compromise proprietary company information. While some organizations have attempted to mitigate this risk by restricting applications a user may install on a device, enforcing such restrictions and/or determining whether an application is malicious has proven difficult.

SUMMARY

Technologies are generally described that include methods and systems. An example method may include parsing code of an application configured for execution on a user device to identify one or more sensitive portions of the code. Example methods may further include identifying a trusted execution environment, different from the user device, suitable to execute the one or more sensitive portions of the code. Example methods may further include configuring the code to provide the one or more sensitive portions of the code from the user device to the trusted execution environment during execution of the application on the user device.

In some examples, configuring the code to provide the one or more sensitive portions of the code may include configuring the code to encrypt at least one of the identified one or more sensitive portions of the code and configuring the code to anonymize the at least one of the identified one or more sensitive portions of the code.

In some examples, configuring the code to provide the one or more sensitive portions of the code may include configuring network configuration parameters related to the trusted execution environment.

In some examples, identifying a trusted execution environment may include identify the environment based, at least in part, on one or more security features of the trusted execution environment.

In some examples, parsing code of an application configured for execution on a user device to identify one or more sensitive portions of the code may include parsing controller module of the application.

In some examples, parsing code of an application configured for execution on a user device to identify one or more sensitive portions of the code may include parsing code associated with sensors, persistence, inter-application interaction, or combinations thereof.

An example method may further include identifying another sensitive portion of the code based on the execution metadata.

In another example, at least one non-transitory computer readable storage medium is provided. The at least one non-transitory computer readable storage medium may be encoded with instructions executable by one or more processing units of a computing system, and the instructions may comprise instructions for parsing code of an application to identify one or more sensitive portions of the code. The instructions may further comprise instructions for identifying a trusted execution environment suitable to execute the one or more sensitive portions of the code. The instructions may further comprise instructions for configuring the code to provide the one or more sensitive portions of the code to the trusted execution environment at run time of the application for execution of the one or more sensitive portions of the code in the trusted execution environment.

In some examples, identifying a trusted execution environment for executing the one or more sensitive portions of the code may include selecting the trusted execution environment from a plurality of execution environments.

In some examples, parsing code of an application to identity one or more sensitive portions of the code may include parsing the application based on a model-view-controller architecture.

In some examples, the code may be configured to establish a secure connection between a user device and the trusted execution environment.

In some examples, identifying a trusted execution environment for executing the one or more sensitive portions of the code may include identifying a trusted execution environment based on as security feature, a trust level, network isolation, communication reliability, or combinations thereof.

In some examples, configuring the code to provide the one or more sensitive portions of the code to the trusted execution environment at run time of the application for execution of the one or more sensitive portions of the code in the trusted execution environment may include replicating the one or more sensitive portions of the code in a cloud component.

In some examples, identifying a trusted execution environment for executing the one or more sensitive portions of the code may include determining primitives supported by the trusted execution environment.

Another example method includes executing an application on a user device. The method may further include receiving an indication of a trusted execution environment and at least one configuration parameter responsive to execution of the application. The method may further include establishing communication with the trusted execution environment based on the at least one configuration parameter. The method may further include providing a portion of the application to a trusted execution environment for execution of the portion of the application in the trusted execution environment.

An example method may further include encrypting at least one value associated with the portion of the application and providing the encrypted value to the trusted execution environment.

In some examples, the trusted execution environment may be a trusted execution environment of a cloud infrastructure, and an example method may include providing another portion of the application to a trusted execution environment of the user device for execution of the another portion of the application in the trusted execution module of the user device.

In some examples, executing an application on a user device may include executing a mobile application.

In some examples, establishing communications with the trusted execution environment based on the at least one configuration parameter may include establishing communications with the trusted execution environment using an encryption key, a certificate, or combinations thereof.

In some examples, receiving an indication of a trusted execution environment and at least one configuration parameter responsive to execution of the application may include receiving an indication of a trusted execution environment of a cloud infrastructure.

An example method may further include monitoring execution of the portion of the application in the trusted execution environment.

In yet another example, a device is provided. The device may include at least one processing unit and a memory encoded with instructions executable by the at least one processing unit. The instructions may comprise instructions for running an application on the device. The instructions may further comprise instructions for establishing a connection with a trusted execution environment, different from the device. The instructions may further comprise instructions for transmitting portions of the application for execution in the trusted execution environment.

In some examples, the instructions for establishing a connection with a trusted execution environment, different from the device may include instructions for establishing a connection using an encryption key, a certificate, or combinations thereof.

In some examples, the instructions may further include instructions for monitoring execution of the portions of the application in the trusted execution environment.

In some examples, the application may be based on a model-view-controller architecture.

Another example method includes parsing code of an application to identify one or more sensitive portions of the code. The method may further include augmenting the code to include logging code, wherein the logging code is configured to monitor execution of the one or more sensitive portions of the code to provide execution metadata associated with the one or more sensitive portions of the code.

In some examples, augmenting the code to include logging code may include augmenting the code using a plug-in of an integrated development environment.

In some examples, parsing code of an application to identify one or more sensitive portions of the code may include identifying one or more portions of the code which access sensors of a device, store data locally on the device, provide data to a network, communicate with another application, or combinations thereof.

In some examples, the logging code may be configured to monitor execution of the one or more sensitive portions of the code based on an instruction type.

In some examples, augmenting the code to include logging code may include inserting hooks into the code.

In some examples, the logging code may be configured to determine a frequency at which the one or more sensitive portions of the code is executed.

In another example at least one non-transitory computer readable storage medium may be encoded with instructions executable by one or more processing units of a computing system. The instructions may comprise instructions for parsing code to identify one or more sensitive portions of the code. The instructions may further comprise instructions for inserting logging code into the code responsive to identifying the one or more sensitive portions of the code, wherein the logging code is configured to provide execution metadata during execution of the logging code indicating whether the one or more sensitive portions of the code performs a sensitive operation.

In some examples, the one or more sensitive portions of the code may include instructions for accessing a device resource, storing data, transmitting data to a network, communicating with an application, or combinations thereof.

In some examples, the execution metadata may be indicative of a frequency at which the logging code has been executed.

In some examples, the code may include a plurality of instructions and wherein the instructions for parsing code to identify one or more sensitive portions of the code include identifying a type of each of the plurality of instructions.

In some examples, the instructions for inserting logging code into the code responsive to identifying the one or more sensitive portions of the code may include inserting a hook into the code, the hook configured to cause the logging code to be executed.

In some examples, the one or more sensitive portions of the code may include a plurality of sensitive portions, and the non-transitory computer readable storage medium may further include instructions for: for each of the plurality of sensitive portions, generating a portion of the logging code.

In some examples, the instructions for parsing code to identify one or more sensitive portions of the code may include executing a plug-in of an integrated development environment.

In another example at least one non-transitory computer readable storage medium may be encoded with code executable by one or more processing units. The code may comprise an application including a sensitive code portion and a logging code portion, the logging code portion configured to be executed when the sensitive code portion is executed and configured to provide execution metadata associated with execution of the sensitive code portion.

In some examples, the application may further include a hooking code portion configured to execute the logging code portion when the sensitive code portion is executed.

In some examples, the execution metadata may be indicative of whether the sensitive code portion accessed a resource, stored data, provided data to a network, communicated with another application or combinations thereof.

In some examples, the execution metadata may be indicative of a frequency at which the sensitive code portion has been executed.

In some examples, the application may include a mobile application.

In some examples, the logging code may be configured to store the execution metadata in it database.

In some examples, the logging code may be proximate the sensitive code. The foregoing summary is illustrative only and is not intended to be in any way limiting. In addition to the illustrative aspects, embodiments, and features described above, further aspects, embodiments, and features will become apparent by reference to the drawings and the following detailed description.

The foregoing summary is illustrative only and is not intended to be in an way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
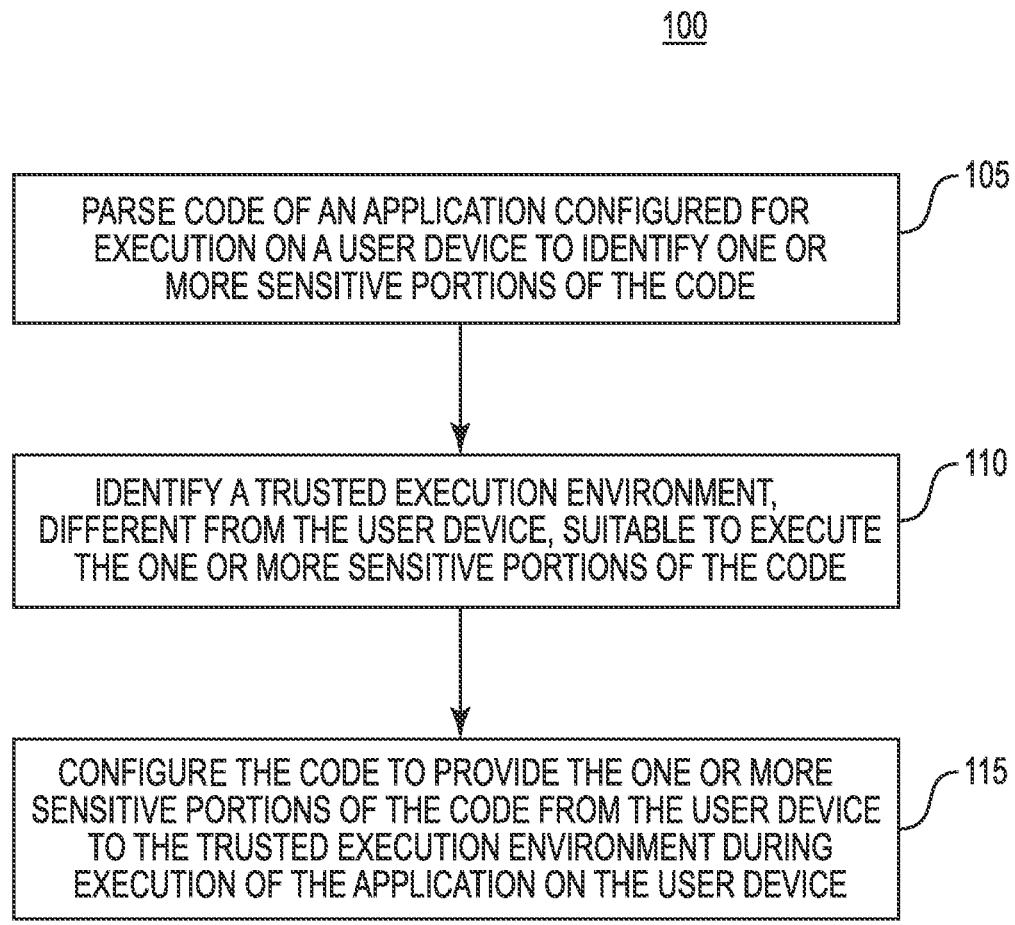
FIG. 1 is a flow chart illustrating an example method to configure an application to execute in a distributed architecture, arranged in accordance with at least some embodiments described herein.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatus generally related to secure application development and execution.

Example methods may include parsing code of an application configured for execution on a user device to identify one or more sensitive portions of the code. Example methods may further include identifying a trusted execution environment, different from the user device, suitable to execute the one or more sensitive portions of the code. Example methods may further include configuring the code to provide the one or more sensitive portions of the code from the user device to the trusted execution environment during execution of the application on the user device.

FIG. 1 is a flow chart illustrating an example method 100 to configure an application to execute in as distributed architecture, arranged in accordance with at least some embodiments described herein. The example method 100 may include one or more operations, functions, or actions as illustrated by one or more of blocks 105, 110, and/or 115. The operations described in the blocks 105-115 may be performed in response to execution (such as by one or more processors described herein) of computer-executable instructions stored in a computer-readable medium, such as a computer-readable medium of a computing device or other one or more controllers similarly configured.

An example process may begin with block 105, which recites "parse code of an application configured for execution on a user device to identify one or more sensitive portions of the code." Block 105 may be followed by block 110, which recites "identify a trusted execution environment, different from the user device, suitable to execute the one or more sensitive portions of the code." Block 110 may be followed by block 115, which recites "configure the code to establish a connection between the user device and the trusted execution environment and provide the one or more sensitive portions of the code from the user device to the trusted execution environment during execution of the application on the user device."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, blocks 110 and 105 may be reversed.

Block 105 recites, "parse code of an application configured for execution on a user device to identify one or more sensitive portions of the code." Generally, an application may include software (e.g., code), or a set of instructions, directed to performing any number of specific tasks. An application may, for instance, manipulate text, data, graphics, or combinations of these elements. An application may further be stored in one or more computer-readable media and may be executed using one or more processing units of a device. Computer-readable media may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage. A device on which an application is stored may include a computing device, physical or virtual, including but not limited to a modem, a router, a gateway, a server, a thin client, a laptop, a desktop, a computer, a tablet, a media device, a smart phone, a cellular phone or other mobile device, a wearable computing device, an appliance, an automobile, or any combination or subcombination of the same.

Briefly, code of an application may be parsed to identify particular portions as being sensitive. By way of example, sensitive portions of code, or sensitive code, may include code configured to access one or more sensors of a device and/or process data provided by one or more sensors of the device. In another example, sensitive code may include code configured to store data locally and/or provide data to another device, such as a local application data access module. In yet another example, sensitive code may include code configured to initialize and/or communicate with another application or other software (e.g., operating system or utility). Additionally or alternatively, portions of the code may be identified in other manners as well. For example, in some instances an application may be implemented using a model-view-controller (MVC) architecture, and code of the application may correspond to a model module, a view module, or an application module of the application. Code corresponding to the model module may, for instance, comprise code directed to an application's algorithms. Code corresponding to the view module may, for instance, comprise code directed to providing a user interface. Code corresponding to a controller module may, for instance, comprise code directed to providing an interface between the model and view modules. Briefly, in parsing the code, it may be determined which portions of the application correspond to the model module, the view module, or the application module, respectively.

In at least some examples, code of an application may be parsed using an integrated development environment (IDE), and in some examples, may be parsed using a particular component (e.g., compiler) of the IDE. As will be described in more detail below, by parsing the code using an IDE, the application may be configured such that during execution of the application, sensitive code is executed in a distributed architecture.

Block 110 recites, "identify a trusted execution environment, different from the user device, suitable to execute the one or more sensitive portions of the code." Generally, a trusted execution environment (TrEE) may be an execution environment configured to securely execute data and/or code privy to the TrEE. A TrEE may provide, for instance, isolated secure execution, secure storage of data, and/or a method of verifying integrity of the TrEE. A TrEE may be implemented using hardware and/or software and accordingly may be implemented, for instance, as a chipset on a physical device, as software executing in parallel with an operating system, and/or in a cloud infrastructure. Example TrEEs may include SIM cards, Trusted Platform Module (TPM) chipsets, Mobile Trusted Module (MTM) chipsets, and virtual On-Board Credentials (OBC) platforms.

One or more trusted execution environments (TrEEs) suitable to execute sensitive code may be identified (e.g., selected). Identification of the trusted execution environments (TrEEs) may occur after identification of the sensitive code in some examples. In some examples, a TrEE may be identified based on one or more features of the TrEE. For example, a TrEE may be identified based on security features of a TrEE and/or the types of primitives supported by the TrEE. In this manner, compatibility between the sensitive code and the TrEE may be ensured. A TrEE may further be identified based on a trust level and/or network isolation. For example, a TrEE may be identified based on operations, computing, resources, and/or network communications available to an application executing in the TrEE, or more specifically, available to the sensitive code executing in the TrEE. A TrEE may further be identified based on communication reliability.

In instances in which an application is implemented using an MVC architecture, a first TrEE may be identified for executing the sensitive code corresponding to a model module, or sensitive model code. A second TrEE may be identified for executing sensitive code corresponding to a controller module, or sensitive controller code. Sensitive model code may be executed remotely, for instance, in a cloud infrastructure, and sensitive controller code may be executed locally, for instance, on a device.

Accordingly, a TrEE may be identified for execution of sensitive model code and a TrEE may be identified for execution of sensitive controller code. In some examples, a TrEE identified for execution of sensitive controller code may be identified from a plurality of local TrEEs and a TrEE identified for execution of sensitive model code may be identified from a plurality of remote TrEEs. Each of the plurality of TrEEs remote to a device may be located on a same cloud infrastructure, or may be located on multiple cloud infrastructures.

In some examples, TrEEs may be identified using an IDE, and more specifically, may be identified using a particular component (e.g., compiler) of the IDE. In some examples, as user or system administrator may manually identify one or more TrEEs.

Block 115 recites, "configure the code to provide the one or more sensitive portions of the code from the user device to the trusted execution environment during execution of the application on the user device." Briefly, after a TrEE has been identified, the application may be configured such that during execution of the application, identified sensitive code is provided to a TrEE for execution. In some examples, sensitive code may be provided to the TrEE responsive to the application being initialized, or may be provided to the TrEE responsive to the sensitive portion being initialized.

In instances in which sensitive code is to be executed in TrEE remote to a device, such as a cloud infrastructure, configuring the code to provide sensitive code may include replicating the sensitive code in a component (e.g., cloud component). In this manner, the sensitive code may be adapted to execute in the TrEE. Accordingly, during execution of the application, the component may be provided to the TrEE such that the sensitive code is executed. In some examples, the component may not simply replicate sensitive code and instead may replicate functionality of the sensitive code.

The component replicating the sensitive code may be provided to the TrEE any time after the TrEE has been identified. In some examples, an application may be configured to include a plurality of components, each of which may be configured to operate with a respective TrEE or TrEE type. Accordingly, the application may provide a suitable component responsive to identifying a TrEE. In other examples, an application may be configured to acquire one or more suitable components responsive to identifying a TrEE for instance, from a cloud infrastructure including the TrEE, or from another source. Accordingly, the application may acquire a suitable component, and provide the acquired component with the sensitive code to the TrEE for execution. In yet other examples, the application may include a component wrapper and may be configured to modify the component wrapper responsive to identifying a TrEE. The application may, for instance, modify the component wrapper such that the component wrapper is configured to operate in the TrEE and/or includes sensitive code. The application may thereafter provide the modified component wrapper to the TrEE for execution.

Configuring the code may additionally include configuring the application to employ one or more communication protocols. By way of example, the application may be configured to employ one or more secure delegation mechanisms, such as proxy re-encryption. In this manner, communications provided from the application to the TrEE may be encrypted by the application, re-encrypted by the device, and ultimately decrypted by the TrEE, e.g., using private keys stored in the TrEE. In another example, the application may be configured to communicate with the TrEE using one or more specified data encryption methodologies, such as a Diffie-Hellman key exchange. In yet another example, the application may be configured to anonymize a portion or all of communications provided from the application to the TrEE.

For an application implemented with an MVC architecture, the code may be configured such that sensitive model code is provided to a first TrEE and sensitive controller code is provided to a second TrEE in accordance with examples described herein. In at least one embodiment, the sensitive model code may be replicated in a component and the code may be configured to provide the component to a remote TrEE and provide the sensitive controller code to a local TrEE during execution.

In some instances, once the IDE has configured the code to provide sensitive code to one or more TrEEs during execution, as described with respect to block 115, the code may be compiled. Accordingly, the compiled code may include modifications causing the sensitive code to be executed in the identified TrEE(s). The resulting compiled application may be placed on a device for subsequent execution, and may further be configured, for instance, by a user or system administrator, using one or more configuration parameters. Configuring the application in this manner may allow the application to properly interface with one or more TrEEs. For example, the application may be configured with any necessary network identification information (e.g., IP address), keys (e.g., encryption keys), certificates, and for other configuration parameters, required for execution of sensitive code in a TrEE.

Figure 2:
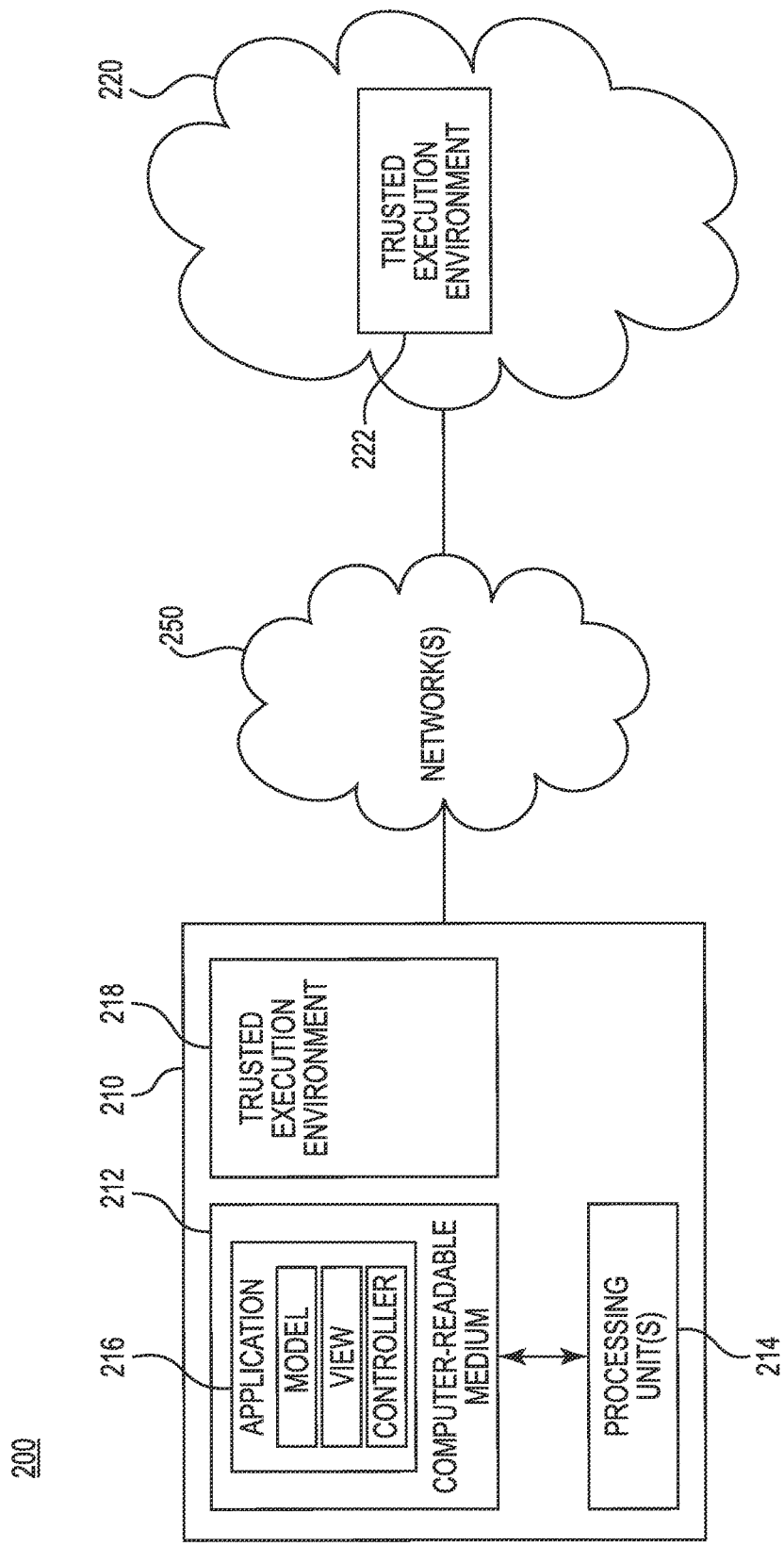
FIG. 2 is a schematic diagram of an example distributed architecture, arranged in accordance with at least some embodiments described herein.

FIG. 2 is a schematic diagram of an example distributed architecture 200, arranged in accordance with at least some embodiments described herein. FIG. 2 shows a user device 210, a cloud infrastructure 220, and a network 250. The device 210 may include a computer readable medium 212, one or more processing units 214, and an execution environment 218. The computer-readable medium may include an application 216. The cloud infrastructure 220 may include a trusted execution environment 222. The various components described in FIG. 2 are merely examples, and other variations, including eliminating components, combining components, and substituting components are all contemplated.

The device 210 may include a computing device, as described, and accordingly may include a modem, a router, a gateway, a server, a thin client, a laptop, a desktop, a computer, a tablet, a media device, a smart phone, a cellular phone or other anther mobile device, a wearable computing device, appliance, automobile, or any combination or subcombination of the same. The one or more processing units 214 of the device 210 may provide functionality allowing execution of executable instructions encoded on the computer readable medium 212, including the application 216. The application 216 may include an application configured to be executed in as distributed architecture, and further may be implemented using as model-view-controller (MVC) architecture. Accordingly, the application 216 may be configured such that one or more sensitive portions of the application 216 may be executed in one or more TrEEs during execution of the application 216. The trusted execution environment 218 may include any trusted execution environment known in the art, now or in the future, and may be local to the device 210. The trusted execution environment 218 may be configured to execute one or more portions of the application 216.

The cloud infrastructure 220 may include a shared pool of configurable computing resources, including but not limited to processing units, networks, servers, storage, applications and/or services. In some examples, the cloud infrastructure 220 may include a private cloud (e.g., corporate cloud). The trusted execution environment 222 may include any trusted execution environment known in the art and may be remote to the device 210. The trusted execution environment 222 may be configured to execute one or more portions of the application 216. As described, in some examples, the trusted execution environment 222 may be configured to execute one or more components included in the application 216. In some examples, the cloud infrastructure 220 may not be present, and the trusted execution environment 222 may be remote from the device 210 without using a cloud infrastructure.

The device 210 and the trusted execution environment 222 may be configured to communicate over the network 250. The network 250 may include one or more networks, such as local area networks (LANs), wide area networks (WANs), metropolitan area networks (MANs), cellular networks, and/or the Internet. Communications provided to, from, and within the network 250 may wired and/or wireless, and further may be provided by any networking devices known in the art, now or in the future. The device 210 and the cloud infrastructure 220 may communicate over the network 250 with any communication protocol, including, TCP/IP and UDP protocols.

Figure 3:
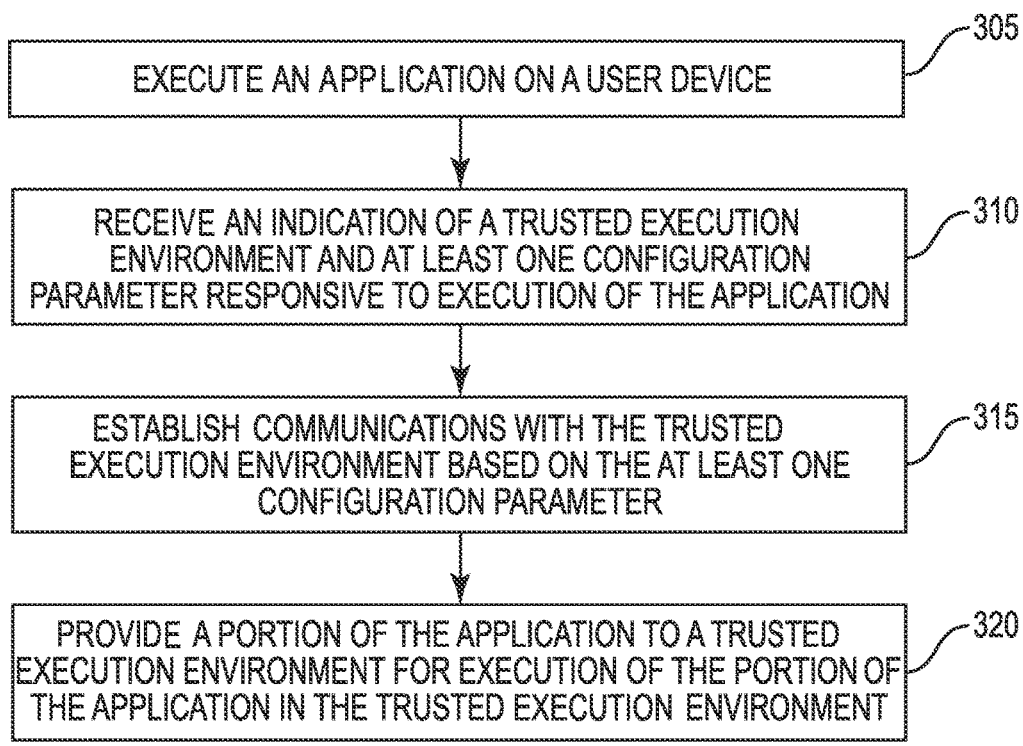
FIG. 3 is a flow chart diagram of an example method to execute an application in a distributed architecture, arranged in accordance with at least some embodiments described herein.

FIG. 3 is a flow chart diagram of an example method 300 to execute an application in a distributed architecture, arranged in accordance with at least some embodiments described herein. The example method 300 may include one or more operations, functions or actions as illustrated by one or more of blocks 305, 310, 315, and/or 320. The operations described in the blocks 305-320 may be performed in response to execution (such as by one or more processors described herein) of computer-executable instructions, stored in a computer-readable medium, such as a computer-readable medium of a computing device or some other controller similarly configured.

An example process may begin with block 305, which recites "execute an application on a user device." Block 305 may be followed by block 310, which recites "receive an indication of a trusted execution environment and at least one configuration parameter responsive to execution of the application." Block 310 may be followed by block 315, which recites "establish communications with the trusted execution environment based on the at least one configuration parameter." Block 315 may be followed by block 320, which recites "provide a portion of the application to a trusted execution environment for execution of the portion of the application in the trusted execution environment."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, the method may also include as block directed to providing an additional portion of the application to a local trusted execution environment.

Block 305 recites, "execute an application on a user device." As described above, the device 210 may be configured to execute an application 216 using the one or more processing units 214. The device 210 may execute the application 216 in response to an input, for instance, from a user of the device 210. Any number of applications may be used, including, but not limited to, email applications, gaming applications, navigation applications, device control applications, shopping applications, word processing applications, and data analysis applications.

Block 310 recites, "receive an indication of a trusted execution environment and at least one configuration parameter responsive to execution of the application." Because the application 216 may be configured to execute in a distributed architecture, such as the distributed architecture 200 of FIG. 2, one or more sensitive portions of the application 216 may be executed in a trusted execution environment (TrEE), as described.

Accordingly, after the application 216 has been initialized, the application 216 may provide an indication of a TrEE. The TrEE indicated by the application 216 may be a TrEE identified by an IDE during configuration of the application 216 and accordingly may be the TrEE in which sensitive code of the application 216 is to be executed. The application 216 further may indicate one or more configuration parameters. As described, the configuration parameters may be used to provide communication between the application 216 and the TrEE indicated by the application 216.

In examples in which the application 216 has been implemented using an MVC architecture, the application 216 may indicate TrEEs for execution of sensitive model code and sensitive controller code, respectively.

Block 315 recites, "establish communications with the trusted execution environment based on the at least one configuration parameter." After an indication of a TrEE and a configuration parameter have been received, communications between the application 216 and the TrEE may be established. In some instances, the communications may be based on the configuration parameter. By way of example, the configuration may comprise an IP address of the TrEE, and the application 216 may initiate communications with the TrEE using the IP address.

In some examples, communications may be established using a run-time adaptor included in at least one of the device 210 or the application 216. The run-time adaptor may, for instance, establish the communication link responsive to determining that sensitive code of the application 216 is being executed or will be executed.

In examples in which the application 216 has been implemented using an MVC architecture, the application 216 may establish respective communications with a TrEE for execution of sensitive model code and a TrEE for execution of sensitive controller code.

Block 320 recites, "provide a portion of the application to a trusted execution environment for execution of the portion of the application in the trusted execution environment." After communications have been established between the application 216 and the TrEE, sensitive code of the application 216 may be provided to the TrEE for execution. Providing sensitive code in this manner may further include providing one or more configuration parameters, such as a key or a certificate, required for execution of the sensitive code in the TrEE. As described, providing sensitive code may include providing a component configured to be executed in the TrEE. The component may be a replication of sensitive code of the application.

In some examples, a component may be provided to the TrEE by the run-time adaptor. The adaptor may, for instance, receive the component from the application 216 and provide the component to the TrEE for execution. Thereafter, the run-time adaptor may further monitor execution of the component in the TrEE, and further may provide data indicative of the same. Data provided in this manner may be stored on the device 210, or may be provided to a remote location, such as in the cloud infrastructure 220.

In examples in which the application has been implemented using an MVC architecture, a component may be provided to a remote TrEE for executing sensitive model code and sensitive controller code may be provided to a local TrEE for execution of the sensitive controller code.

Figure 4:
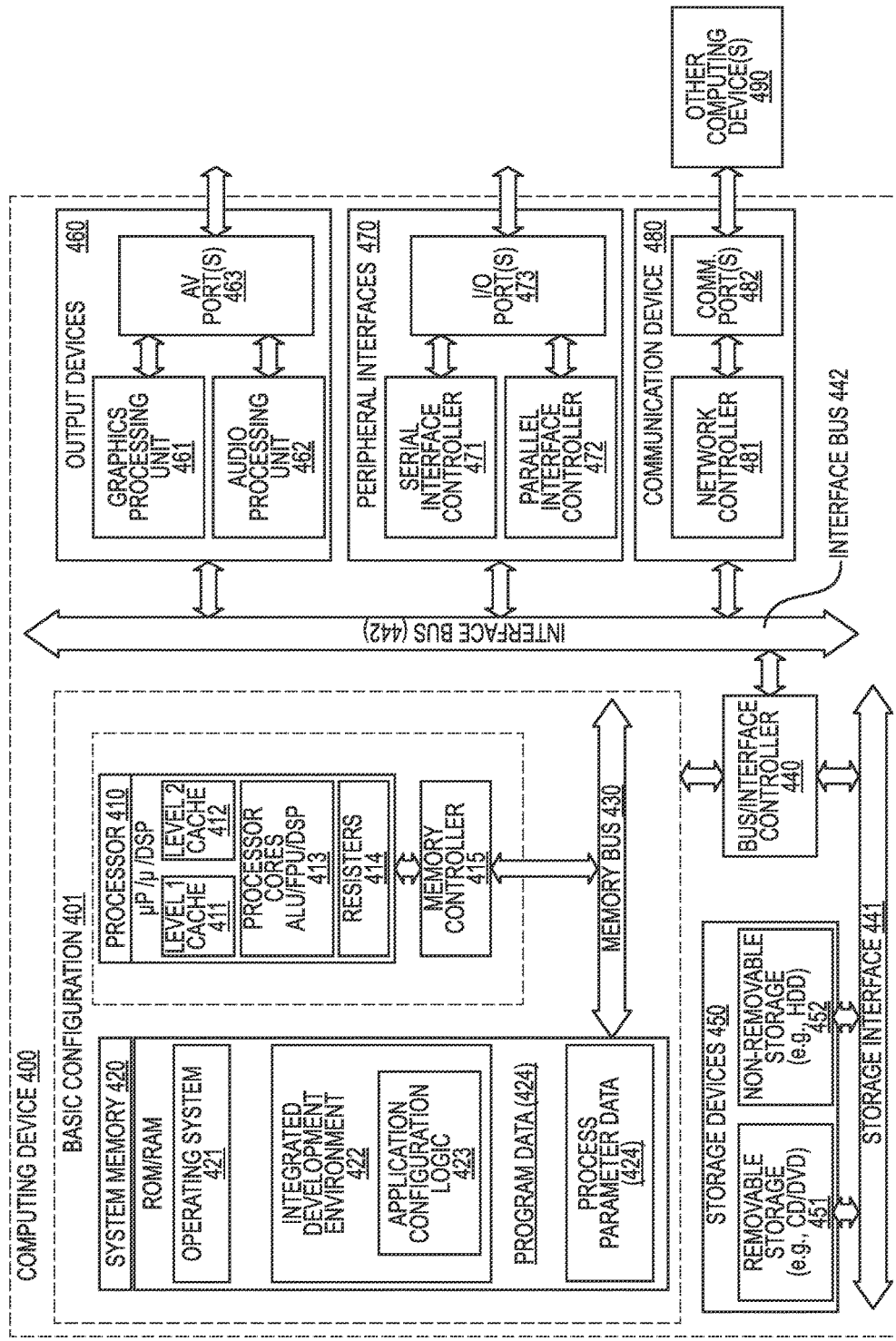
FIG. 4 is a block diagram illustrating an example computing device that is arranged to configure an application to execute in a distributed architecture in accordance with at least some embodiments described herein.

FIG. 4 is a block diagram illustrating an example computing device 400 that is arranged to configure an application to execute in a distributed architecture in accordance with at least some embodiments described herein. In a very basic configuration 401, computing device 400 typically includes one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP) or an combination thereof. Processor 410 may include one more levels of caching, such as a level one cache 411 and a level two cache 412, a processor core 413, and registers 414. An example processor core 41 may include an arithmetic logic unit (ALU), a floating point unit (FPU), a digital signal processing core (DSP Core), or any combination thereof. An example memory controller 415 may also be used with the processor 410, or in some implementations the memory controller 41 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Integrated Development Environment 422 may include application configuration logic 423 that is arranged to configure an application to be executed in a distributed architecture as described herein. In some embodiments, application 422 may be arranged to operate with program data 424 on an operating system 421 such that any of the procedures described herein may be performed. This described basic configuration is illustrated in FIG. 4 by those components within dashed line of the basic configuration 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more storage devices 450 via a storage interface bus 441. The storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which ma be used to store the desired information and which may be accessed by computing device 400. Any such computer storage media may be part of computing device 400.

Computing device 400 may also include an interface bus 442 for facilitating communication from various interface devices (e.g. output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication device 480 includes to network controller 481, which may be arranged to facilitate communications with one or more other computing devices 490 over a network communication link via one or more communication ports 482.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

Figure 5:
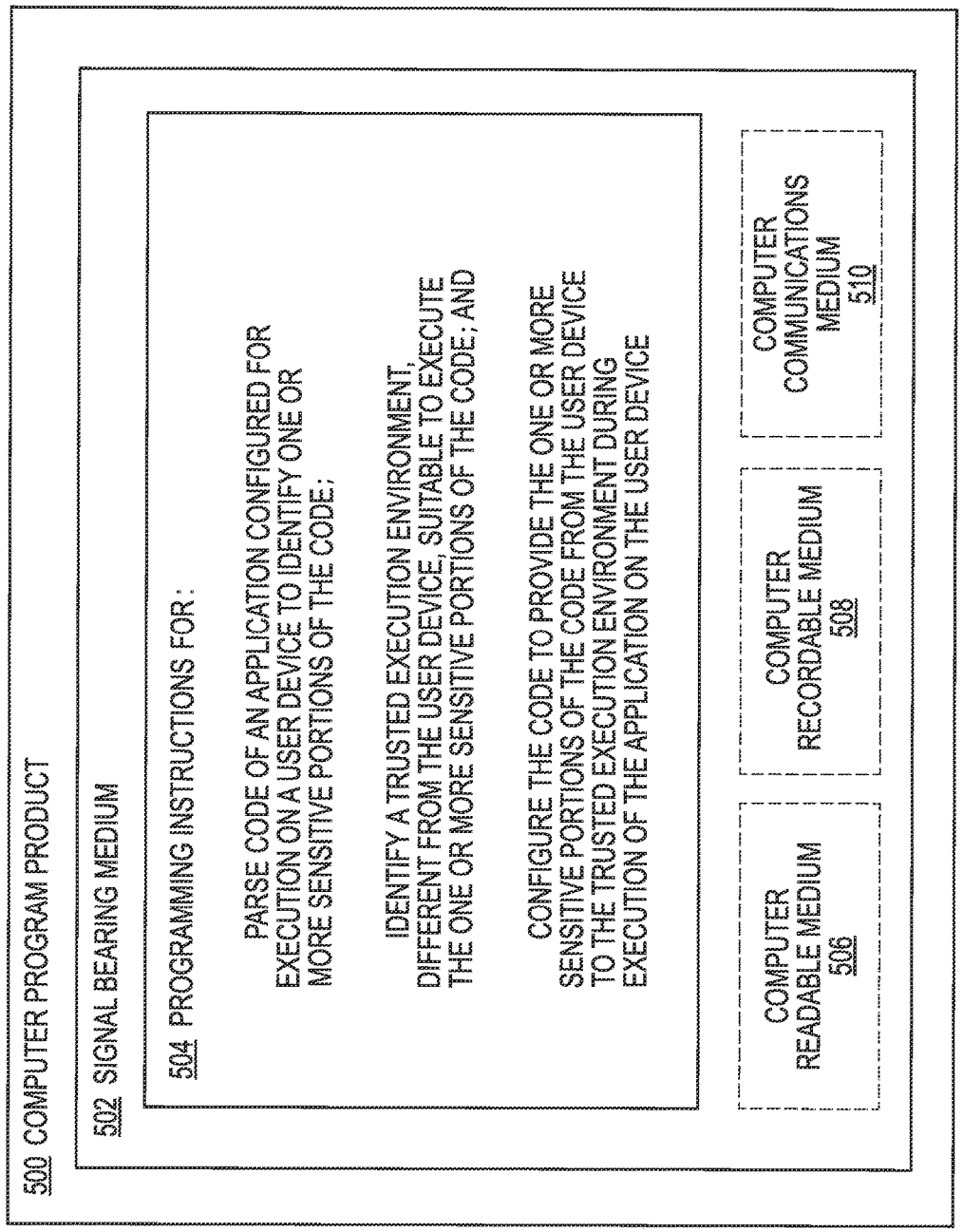
FIG. 5 is a block diagram illustrating an example computer program product that is arranged to store instructions to configure an application to execute in a distributed architecture in accordance with at least some embodiments described herein.
Figure 6:
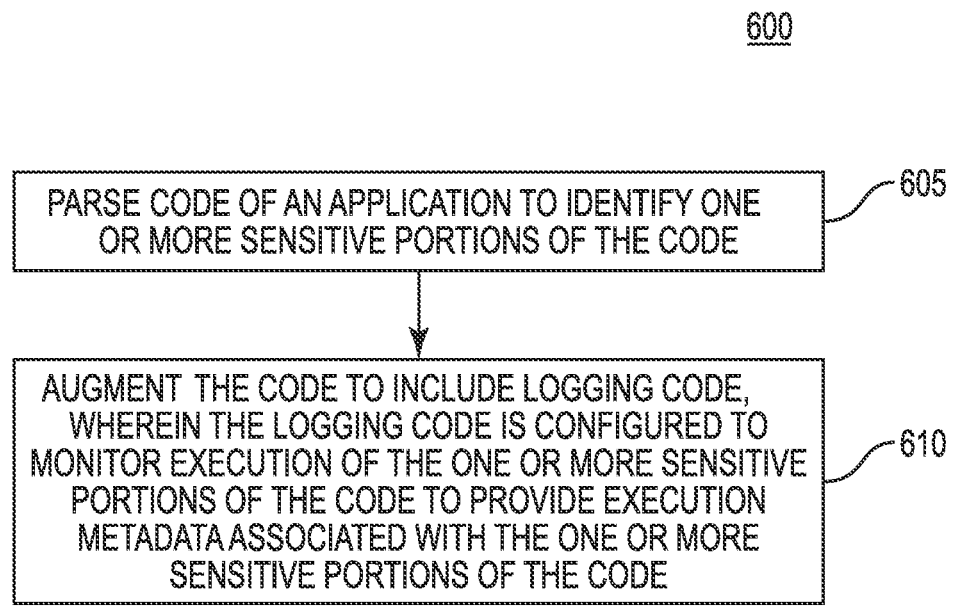
FIG. 6 is a flow chart illustrating an example method to configure an application to provide execution metadata, arranged in accordance with at least some embodiments described herein.

FIG. 5 is a block diagram illustrating an example computer program product 500 that is arranged to store instructions to configure an application to execute in a distributed architecture in accordance with at least some embodiments described herein. The signal bearing medium 502 which may be implemented as or include a computer-readable medium 506, a computer recordable medium 508, a computer communications medium 510, or combinations thereof, stores programming instructions 504 that may configure the processing unit to perform all or some of the processes previously described. These instructions may include, for example, one or more executable instructions to parse code of an application to identity one or more sensitive portions of the code, identify a trusted execution environment suitable to execute the one or more sensitive portions of the code, and configure the code to provide the one or more sensitive portions of the code to the trusted execution environment at run time of the application for execution of the one or more sensitive portions of the code in the trusted execution environment FIG. 6 is a flow chart illustrating an example method 600 to configure an application to provide execution metadata, arranged in accordance with at least some embodiments described herein. The example method 600 may include one or more operations, functions or actions as illustrated by one or more of blocks 605 and/or 610. The operations described in the blocks 605-610 may be performed in response to execution (such as by one or more processors described herein) of computer-executable instructions stored in a computer-readable medium, such as a computer-readable medium of a computing device or some other controller similarly configured.

An example process may begin with block 605, which recites "parse code of an application to identify one or more sensitive portions of the code." Block 605 may be followed by block 610, which recites "augment the code to include logging code, wherein the logging code is configured to monitor execution of the one or more sensitive portions of the code to provide execution metadata associated with the one or more sensitive portions of the code."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, the method 600 may include a block directed to generating logging code and/or compiling an application.

Block 605 recites, "parse code of an application to identify one or more sensitive portions of the code." Briefly, portions of an application directed to performing particular types of tasks may be identified as sensitive. By way of example, sensitive portions of code, or sensitive code, may include code configured to access one or more sensors of a device and/or process data provided by one or more sensors of the device. In another example, sensitive code may include code configured to store data locally and/or provide data to another device, such as a local application data access module. In yet another example, sensitive code may include code configured to initialize and/or communicate with another application or other software (e.g., operating system or utility).

As described, an application may comprise software (e.g., code), or a set of instructions, directed to performing any number of specific tasks. An application may, for instance, manipulate text, data graphics, or combinations of these elements. An application may further be stored in one or more computer-readable media and may be executed using one or more processing units of a device. Computer-readable media may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage. A device on which an application is stored may comprise a computing device, physical or virtual, including but not limited to a modem, a router, a gateway, a server, a thin client, a laptop, a desktop, a computer, a tablet, a media device, a smart phone, a cellular phone or other mobile device, a wearable computing device, an appliance, an automobile, or any combination or sub-combination of the same.

In at least some examples, code of an application may be parsed in an integrated development environment (IDE), and more specifically, may be parsed using a particular component (e.g., plug-in) of the IDE. As will be described in more detail below, by parsing the cock using an IDE, identified sensitive code of the application may be supplemented and/or augmented to configure the application to perform one or more particular tasks, such as providing execution metadata.

Block 610 recites, "augment the code to include logging code, wherein the logging code is configured to monitor execution of the one or more sensitive portions of the code to provide execution metadata associated with the one or more sensitive portions of the code." Once sensitive code has been identified, logging code associated with the identified sensitive code may be generated. Generally, the logging code include code configured to monitor execution of the sensitive code, and further may be configured to generate execution metadata indicative of when and/or how frequently the sensitive code is executed. Execution metadata generated in this manner may be stored in one or more logs by the logging code. Logs may be stored in a directory path and/or a database accessible to the logging code. In some examples, the logging code may be based on the type of instructions included in the sensitive code and further may be configured to provide execution metadata at a specified frequency such that logs are updated in accordance with the frequency. Logs may be updated, for instance, every minute, or may be updated every hour in some examples. Other frequencies may also be used.

Once the logging code is generated, the application may be augmented and/or configured to include the logging code. In some examples the logging code may be inserted in the application proximate the sensitive code such that execution of the logging code occurs prior to, concurrently with, and/or after execution of the sensitive code. In this manner, the logging code may monitor execution of the sensitive code. In some examples, logging code need not be inserted proximate the sensitive code. For example, the application may be augmented and/or configured to include one or more hooks. Hooks inserted in this manner mass be configured to execute the logging code each time the sensitive code is executed.

In some examples, logging code may be generated and/or inserted into an application using an IDE, and more specifically, using a particular component (e.g., plug-in) of the IDE.

Once sensitive code of the application has been identified, and the application has been augmented to include logging code associated with the sensitive code, the application may be compiled and executed. Executing the application may cause execution of sensitive code, and as a result, execution of the inserted logging code. The logging code may provide (e.g., generate) execution metadata indicative of the manner and frequency in which the sensitive code is executed. The execution metadata may be used, for instance, by a user or system administrator, to evaluate run-time characteristics of the application.

In some examples, execution metadata may be used to identify additional sensitive of an application. By way of example, one or more portions of the application may include sensitive code not be identified during parsing of the code. Following execution of the application, the execution metadata may be used to identify additional sensitive code, and in some instances, may be further augmented and/or configured to include logging code associated with the additional sensitive code. The application may subsequently be compiled and executed to provide execution metadata for the additional sensitive code.

Figure 7:
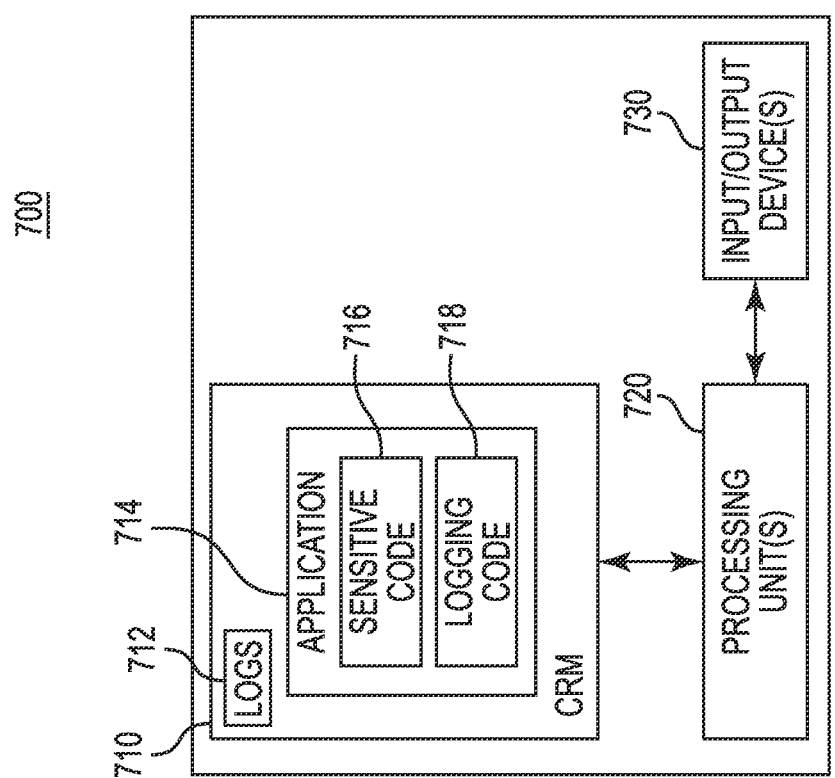
FIG. 7 is as schematic diagram of an example device that is arranged to provide execution metadata, arranged in accordance with at least some embodiments described herein.

FIG. 7 is a schematic diagram of an example device 700 that is arranged to provide execution metadata, arranged in accordance with at least some embodiments described herein. FIG. 7 shows a computer-readable medium 710, one or more processing units 720, and input/output devices 730. The computer readable medium 710 may include a log storage 712 and an application 714. The application 714 may include sensitive code 716 and logging code 718. The various components described in FIG. 7 are merely examples, and other variations, including eliminating components, combining components, and substituting components are all contemplated.

The device 700 may comprise a computing device, as described, and accordingly may include a modem, a router, a gateway, a server, a thin client, a laptop, a desktop, a computer, as tablet, a media device, a smart phone, a cellular phone or other mobile device, a wearable computing device, appliance, automobile, or an combination or sub-combination of the same. The one or more processing units 720 of the device 700 may provide functionally allowing execution of executable instructions encoded on the computer readable medium 710, including the application 714.

As described, the logging code 718 may be located proximate the sensitive code 716 and/or the application 714 may include hooks configured to execute the logging code 718 responsive to execution of the sensitive code 716. Accordingly, the logging code 718 may be configured to monitor execution of sensitive code 716 during execution of the application 714. The logging code 718 may further be configured to provide execution metadata indicative of the manner and frequency of execution of the sensitive code 716 during execution of the application 714. The logging code 718 may be configured to store the execution metadata in logs of the log storage 712, or may be configured to store the execution metadata in another location, such as a remote database.

Figure 8:
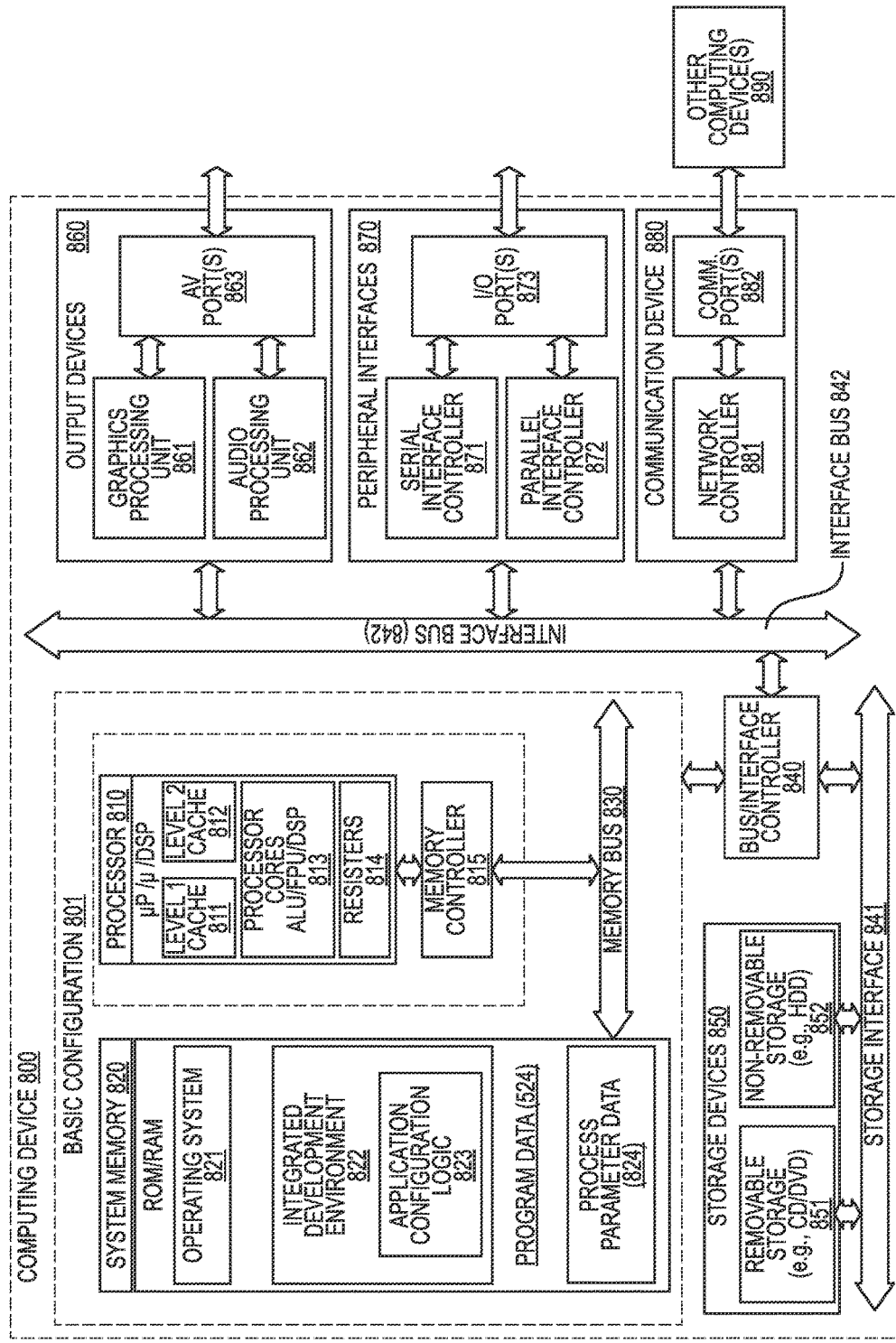
FIG. 8 is a block diagram illustrating an example computing device that is arranged to configure an application to provide execution metadata in accordance with at least some embodiments described herein.

FIG. 8 is a block diagram illustrating an example compiling device 800 that is arranged to configure an application to provide execution metadata in accordance with at least some embodiments described herein. In a very basic configuration 801, computing device 800 typically includes one or more processors 810 and system memory 820. A memory bus 830 may be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 may include one more levels of caching, such as a level one cache 811 and a level two cache 812, a processor core 813, and registers 814. An example processor core 813 may include an arithmetic logic unit (ALU), a floating point unit (FPU), a digital signal processing core (DSP Core), or any combination thereof. An example memory controller 815 may also be used with the processor 810, or in some implementations the memory controller 815 may be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824, integrated development environment 822 may include application configuration logic 823 that is arranged to configure an application to provide execution metadata as described herein. In some embodiments, application 822 may be arranged to operate with program data 824 on an operating system 821 such that any of the procedures described herein may be performed. This described basic configuration is illustrated in FIG. 8 by those components within dashed line of the basic configuration 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more storage devices 850 via a storage interface bus 841. The storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. An such computer storage media may be part of computing device 800.

Computing device 800 may also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which may be configured to communicate to various external devices such as a display or speakers via one or more A/V ports 863. Example peripheral interfaces 870 include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which may be arranged to facilitate communications with one or more other computing devices 890 over a network communication link via one or more communication ports 882.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile electronic device such as a cell phone, as personal data assistant (PDA), a personal media player device, as wireless web-watch device, a personal headset device, an application specific device, or a hybrid device that include any of the above functions. Computing device 800 may also be implemented as a personal computer including both laptop computer and non-laptop computer configurations.

Figure 9:
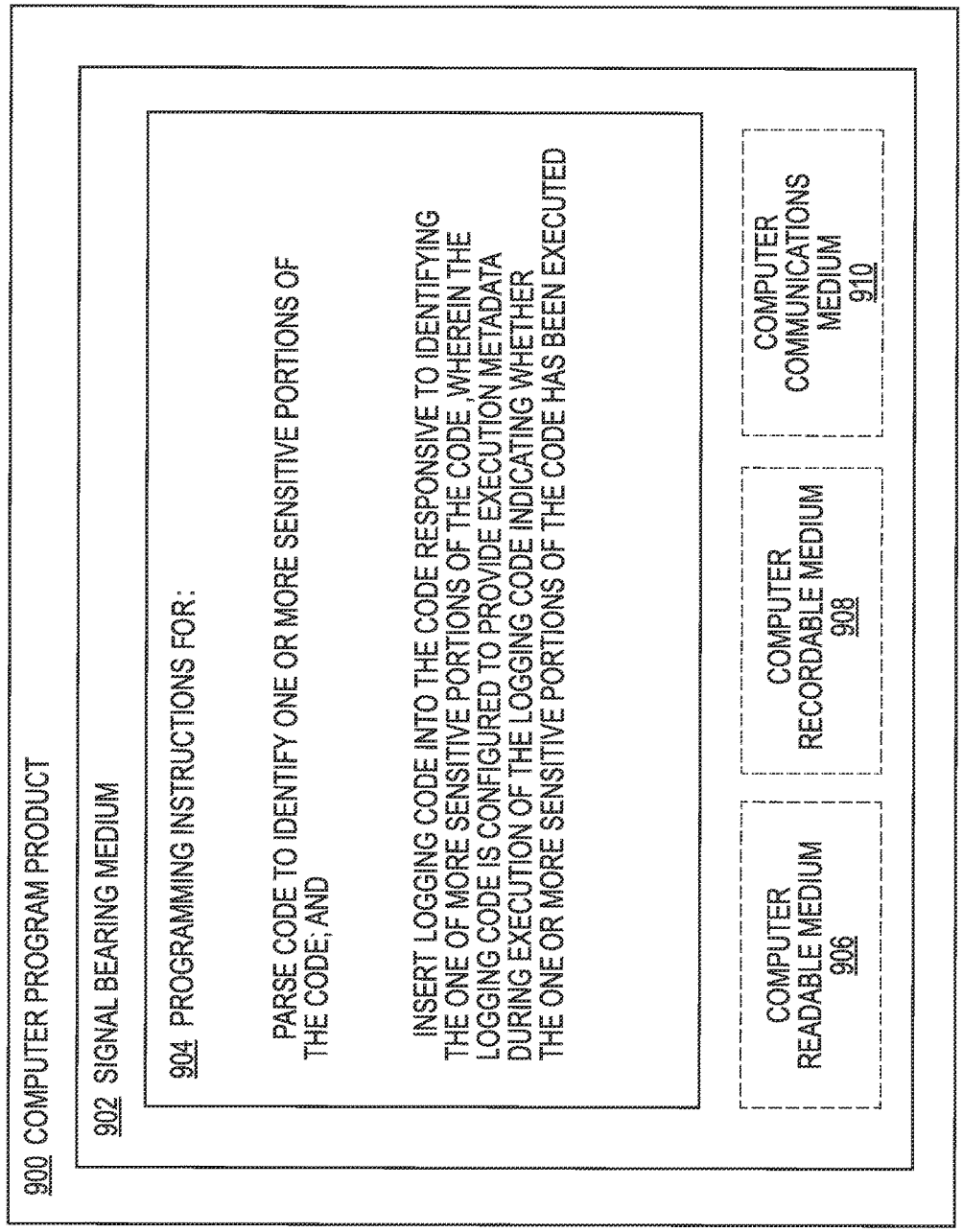
FIG. 9 is a block diagram illustrating in example computer program product that is arranged to store instructions to configure an application to provide execution metadata in accordance with at least some embodiments described herein.

FIG. 9 is a block diagram illustrating an example computer program product 900 that is arranged to store instructions to configure an application to execute in a distributed architecture in accordance with at least some embodiments described herein. The signal bearing medium 902 which may be implemented as or include a computer-readable medium 906, a computer recordable medium 908, a computer communications medium 910, or combinations thereof, stores programming instructions 904 that may configure the processing unit to perform all or some of the processes previously described. These instructions may include, for example, one or more executable instructions to parse code to identify one or more sensitive portions of the code, and insert logging code into the code responsive to identifying the one or more sensitive portions of the code, wherein the logging code is configured to provide execution metadata during execution of the logging code indicating whether the one or more sensitive portions of the code performs a sensitive operation.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more or at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C A and B together, A and C together, B and C together, and/or A, B, and C together, etc). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 8, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range or hardware, software, firmware, or virtually any combination thereof. In one example, several portions of the subject matter described herein may be implemented via Application Specific integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware, vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as at floppy disk, a had disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile, and non-volatile memory, processors such as microprocessors and digital signal processors, computational entities such as operating systems, drivers, graphical use interfaces, and applications programs, one or more interaction devices, such is a touch pad or screen, and/or control systems including feedback loops and control motors (e.g., feedback for sensing position and/or velocity; control motors for moving and/or adjusting components and for quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mate able and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method comprising:
   parsing code of an application configured for execution in an execution environment on a user device to identify one or more sensitive portions of the code;
   identifying a trusted execution environment remote from the user device, suitable to execute the one or more sensitive portions of the code;
   prior to initialization of the application on the user device, configuring the code to provide the one or more sensitive portions of the code from the execution environment of the user device to the trusted execution environment during execution of the application in the execution environment of the user device;
   initializing execution of the application on the user device;
   establishing communications between the application and the trusted execution environment;
   responsive to initializing execution of the application, encrypting the one or more sensitive portions of the code and providing the encrypted one or more sensitive portions of the code to the trusted execution environment; and
   executing the one or more sensitive portions of the code in the trusted execution environment.

2. The method of claim 1, wherein configuring the code to provide the one or more sensitive portions of the code includes:
   configuring the code to anonymize the at least one of the identified one or more sensitive portions of the code.

3. The method of claim 1, wherein configuring the code to provide the one or more sensitive portions of the code includes configuring network configuration parameters related to the trusted execution environment.

4. The method of claim 1, wherein identifying a trusted execution environment includes identifying the environment based, at least in part, on one or more security features of the trusted execution environment.

5. The method of claim 1, wherein parsing code of an application configured for execution in an execution environment on a user device to identify one or more sensitive portions of the code includes parsing a controller module of the application.

6. The method of claim 1, wherein parsing code of an application configured for execution in an execution environment on a user device to identify one or more sensitive portions of the code includes parsing code associated with sensors, persistence, inter-application interaction, or combinations thereof.

7. At least one non-transitory computer readable storage medium encoded with instructions executable by one or more processing units of a computing system, the instructions comprising instructions for:
   parsing code of an application configured for execution in an execution environment on a user device to identify one or more sensitive portions of the code;
   identifying a trusted execution environment remote from the user device, suitable to execute the one or more sensitive portions of the code;
   prior to initialization of the application on the user device, configuring the code to provide the one or more sensitive portions of the code from the execution environment of the user device to the trusted execution environment during the execution of the application in the execution environment of the user device, for execution of the one or more sensitive portions of the code in the trusted execution environment;
   initializing execution of the application on the user device;
   establishing communications between the application and the trusted execution environment;
   responsive to initializing execution of the application, encrypting the one or more sensitive portions of the code and providing the encrypted one or more sensitive portions of the code to the trusted execution environment; and
   executing the one or more sensitive portions of the code in the trusted execution environment.

8. The at least one non-transitory computer readable medium of claim 7, wherein identifying a trusted execution environment for executing the one or more sensitive portions of the code includes selecting the trusted execution environment from a plurality of execution environments.

9. The at least one non-transitory computer readable medium of claim 7, wherein parsing code of an application to identify one or more sensitive portions of the code includes parsing the application based on a model-view-controller architecture.

10. The at least one non-transitory computer readable medium of claim 7, wherein the configuring the code to provide the one or more sensitive portions of the code to the trusted execution environment includes adding instructions to the code for establishing a secure connection between the user device and the trusted execution environment during execution of the application on the user device.

11. The at least one non-transitory computer readable medium of claim 7, wherein identifying a trusted execution environment for executing the one or more sensitive portions of the code includes identifying a trusted execution environment based on a security feature, a trust level, network isolation, communication reliability, or combinations thereof.

12. The at least one non-transitory computer readable medium of claim 7, wherein configuring the code to provide the one or more sensitive portions of the code to the trusted execution environment includes replicating the one or more sensitive portions of the code in a cloud component.

13. The at least one non-transitory computer readable medium of claim 7, wherein identifying a trusted execution environment for executing the one or more sensitive portions of the code includes determining primitives supported by the trusted execution environment.

14. A method comprising:
    executing an application on a user device;
    parsing code of the application configured for execution in an execution environment of the user device to identify one or more sensitive portions of the code;
    identifying at least two trusted execution environments from a plurality of trusted execution environments suitable to execute the one or more sensitive portions of the code;
    receiving an indication of a first trusted execution of the identified at least two trusted execution environments and at least one configuration parameter;
    prior to initialization of the application on the user device, configuring the code to provide the one or more sensitive portions of the code from the execution environment of the user device to the identified at least two trusted execution environments during the execution of the application in the execution environment of the user device;
    initializing execution of the application in the execution environment on the user device; establishing communications between the application and the first trusted execution environment based on the at least one configuration parameter responsive to determining that the one or more sensitive portions of the code is being executed;
    encrypting and providing a first portion of the application including at least one of the one or more sensitive portions of the code to the first trusted execution environment for execution of the first portion of the application in the first trusted execution environment, responsive to determining that the at least one of the one or more sensitive portions of the code is being executed;
    providing a second portion of the application including at least a different one of the one or more sensitive portions of the code for execution in to a second trusted execution environment of the identified at least two trusted execution environments for execution of the second portion of the application in the second trusted execution environment,
    wherein the first trusted execution environment is remote to the user device and the second trusted execution environment is local to the user device; and
    executing the first portion of the application and the second portion of the application in the first trusted execution environment and the second trusted execution environment respectively.

15. The method of claim 14, further comprising:
    encrypting at least one value associated with the first portion of the application or the second portion of the application; and
    providing the encrypted value to the respective first trusted execution environment or the second trusted execution environment.

16. The method of claim 14, wherein executing an application on a user device includes executing a mobile application.

17. The method of claim 14, wherein establishing communications with the first trusted execution environment based on the at least one configuration parameter includes:
    establishing communications with the first trusted execution environment using an encryption key, a certificate, or combinations thereof.

18. The method of claim 14, wherein receiving an indication of a first trusted execution environment includes receiving an indication of a trusted execution environment of a cloud infrastructure.

19. The method of claim 14, further comprising:
    monitoring execution of the first portion of the application in the first trusted execution environment, the second portion of the application in the second trusted execution environment, or both.

20. A computing device comprising:
    at least one processing unit; and
    a memory encoded with instructions executable by the at least one processing unit, wherein the instructions comprise instructions for:
        parsing code of an application configured for execution in an execution environment on the computing device to identify one or more sensitive portions of the code;
        identifying at least two trusted execution environments from a plurality of trusted execution environments suitable to execute the one or more sensitive portions of the code;
        prior to initialization of the application on the computing device, configuring the code to provide the one or more sensitive portions of the code from the execution environment of the computing device to the identified at least two trusted execution environments during the execution of the application in the execution environment of the computing device;
        initializing execution of the application in the execution environment on the computing device; establishing a connection between the application and a first trusted execution environment of the identified at least two trusted execution environments, different from the execution environment of the computing device;
        encrypting and transmitting a first portion of the application including at least one of the one or more sensitive portions of the code to the first trusted execution environment of the identified at least two trusted execution environments for execution, responsive to determining that the at least one of the one or more sensitive portions of the code is being executed;
        transmitting a second portion of the application including at least a different one of the one or more sensitive portions of the code to a second trusted execution environment of the identified at least two trusted execution environments for execution, wherein the first trusted execution environment is remote to the computing device and the second trusted execution environment is local to the computing device; and executing the first portion of the application and the second portion of the application in the first trusted execution environment and the second trusted execution environment respectively.

21. The computing device of claim 20, wherein the instructions for establishing a connection with the first trusted execution environment, different from the execution environment include instructions for establishing a connection using an encryption key, a certificate, or combinations thereof.

22. The computing device of claim 20, wherein the instructions further include instructions for monitoring execution of the first portion of the application in the first trusted execution environment, the second portion of the application in the second trusted execution environment, or both.

23. The computing device of claim 20, wherein the application is based on a model-view-controller architecture.

24. The method of claim 1, wherein parsing code of an application configured for execution on a user device to identify one or more sensitive portions of the code includes parsing the code to identify code configured to access one or more sensors of the user device, code configured to process data provided by one or more sensors of the user device, code configured to cause data to be stored locally on the user device, code configured to initialize another application, or combinations thereof.

25. The method of claim 1, wherein the application results from compiling the code.

26. The method of claim 1, wherein parsing code of an application configured for execution in an execution environment comprises parsing the code in an integrated development environment thereby configuring the application such that during execution of the application, the sensitive code is executed in a distributed architecture.

27. The at least one non-transitory computer readable medium of claim 7, wherein instructions for parsing code of an application to identify one or more sensitive portions of the code includes instructions for parsing the code to identify code configured to access one or more sensors of the user device, code configured to process data provided by one or more sensors of the device, code configured to cause data to be stored locally on the user device, code configured to initialize another application, or combinations thereof.

28. The at least one non-transitory computer readable medium of claim 7, wherein the application results from compiling the code.

* * * * *